United States Patent
Kaempen

[15] 3,677,432
[45] July 18, 1972

[54] COMPOSITE STRUCTURE

[72] Inventor: Charles E. Kaempen, 3202 Larkstone Drive, Orange, Calif. 92667

[22] Filed: May 2, 1969

[21] Appl. No.: 821,327

[52] U.S. Cl.....................................220/3, 161/92, 161/95, 161/111, 161/115, 161/216, 220/71, 220/83
[51] Int. Cl...........................................................B32b 3/04
[58] Field of Search............161/89, 92, 93, 94, 95, 109–115, 161/216; 220/3, 71, 83; 224/119, 120; 55/370

[56] References Cited

UNITED STATES PATENTS

| | | | |
|---|---|---|---|
| 3,444,035 | 5/1969 | Bushnell | 161/92 X |
| 3,214,320 | 10/1965 | Lappalla et al. | 161/89 |
| 3,116,120 | 12/1963 | Koskinen | 161/110 |
| 2,983,960 | 5/1961 | Jilge | 156/155 X |
| 2,978,376 | 4/1961 | Hulse | 161/89 X |
| 2,973,293 | 2/1961 | Schofield | 161/98 |
| 2,733,177 | 1/1956 | Meyer | 161/111 X |
| 2,489,541 | 11/1949 | Read | 161/109 X |
| 2,260,874 | 10/1941 | Van Pelt | 55/379 |
| 3,308,958 | 3/1967 | Berger et al. | 55/379 |

Primary Examiner—Robert F. Burnett
Assistant Examiner—Mark A. Litman
Attorney—Fryer, Tjensvold, Feix, Phillips & Lempio

[57] ABSTRACT

A structure comprising flattened expanded metal, or the like, having a sealed fabric of nylon or glass cloth bonded thereto by an intervening polyurethane elastomeric plastic. The structure disclosed is a storage tank having a framework, including circumferentially spaced longerons and longitudinally spaced rings secured to the longerons, with the sealed fabric bonded by the elastomeric plastic to the expanded metal and the surfaces of the framework which is engages. End portions of the framework have flattened expanded metals secured thereto and to which the sealed fabric is bonded by the polyurethane elastomeric plastic. A band of continuous filament glass may be wound around and bonded to the fabric.

21 Claims, 14 Drawing Figures

Patented July 18, 1972 3,677,432
4 Sheets-Sheet 1
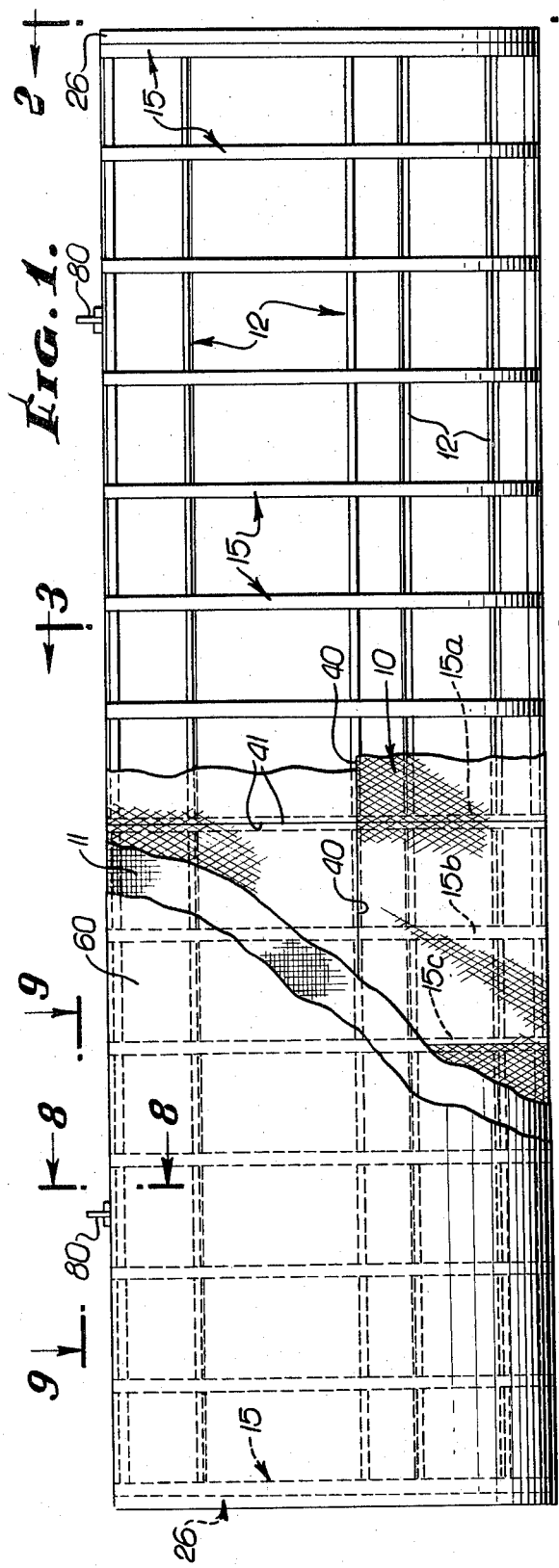
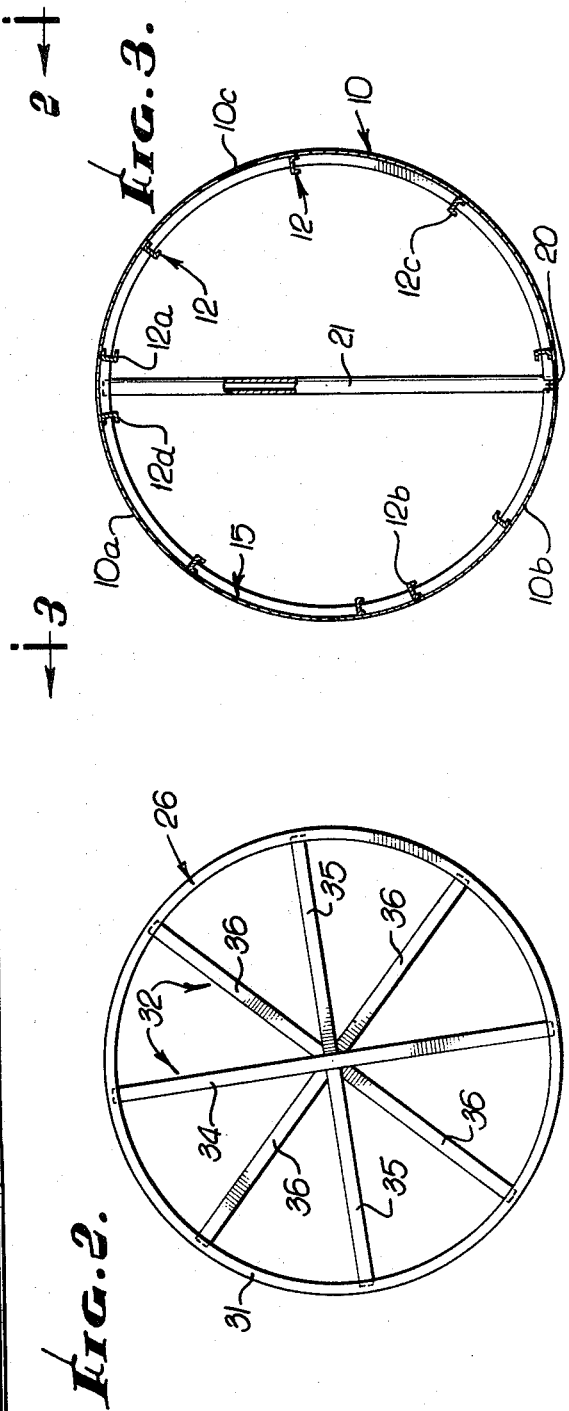
INVENTOR.
CHARLES E. KAEMPEN
By Bernard Kriegel
ATTORNEY.

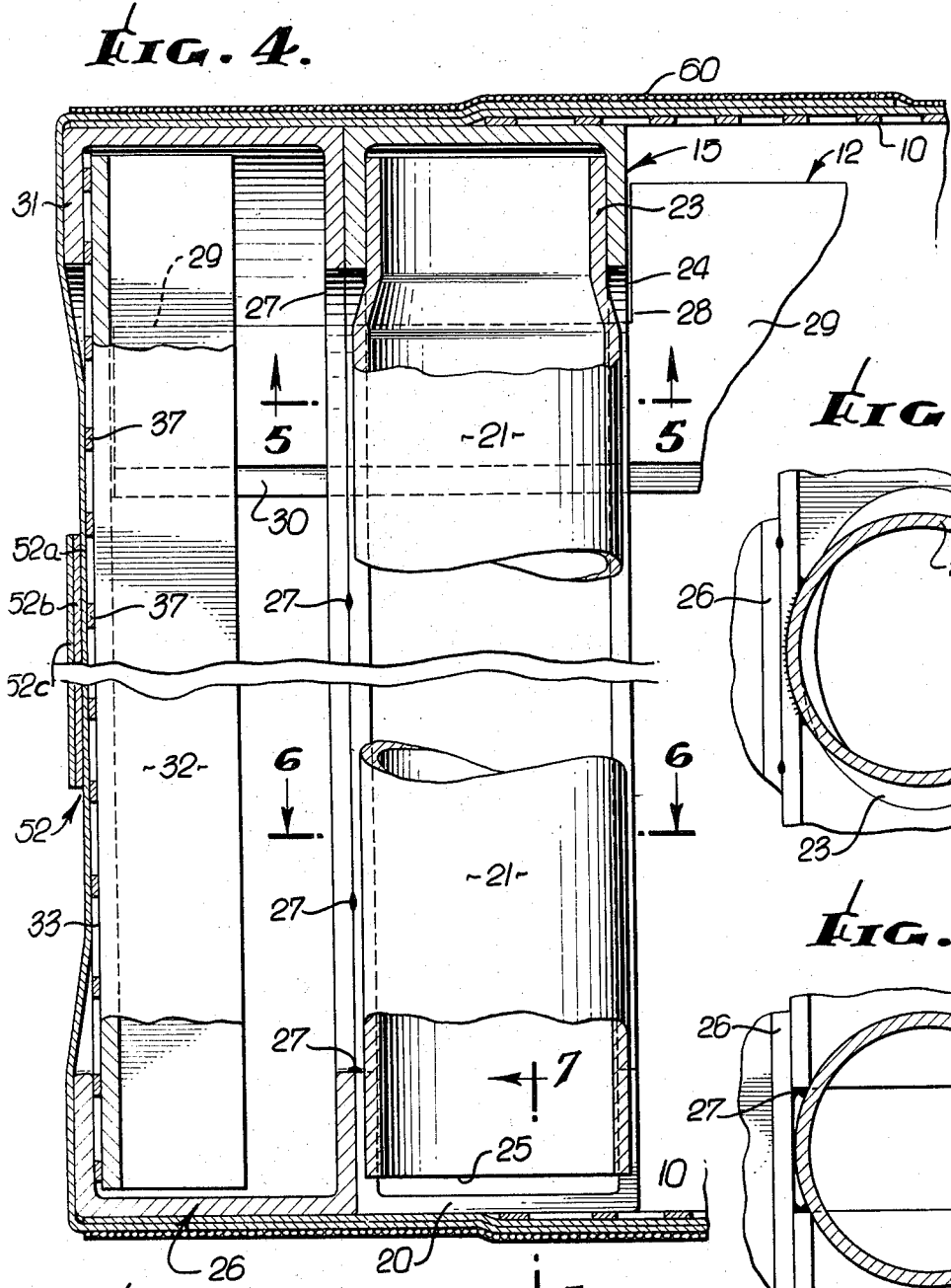
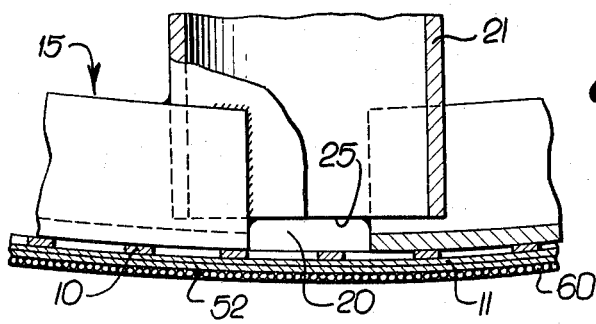

Patented July 18, 1972

INVENTOR.
CHARLES E. KAEMPEN
BY Bernard Kriegel
ATTORNEY.

Patented July 18, 1972
3,677,432
4 Sheets-Sheet 4
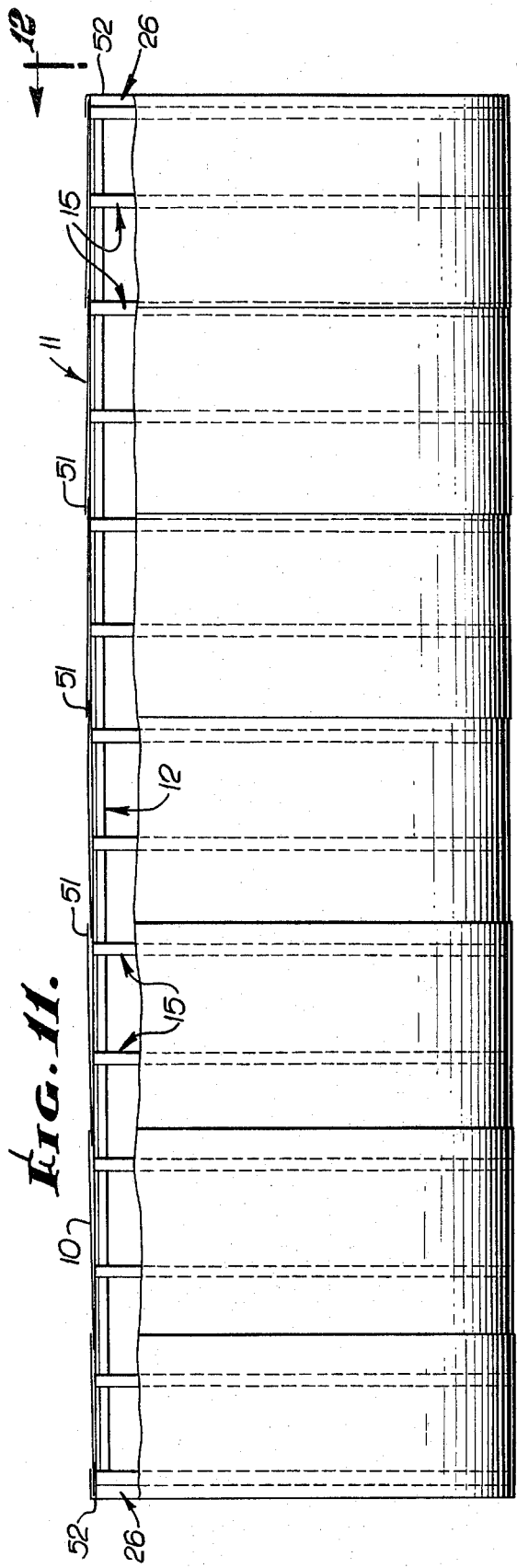
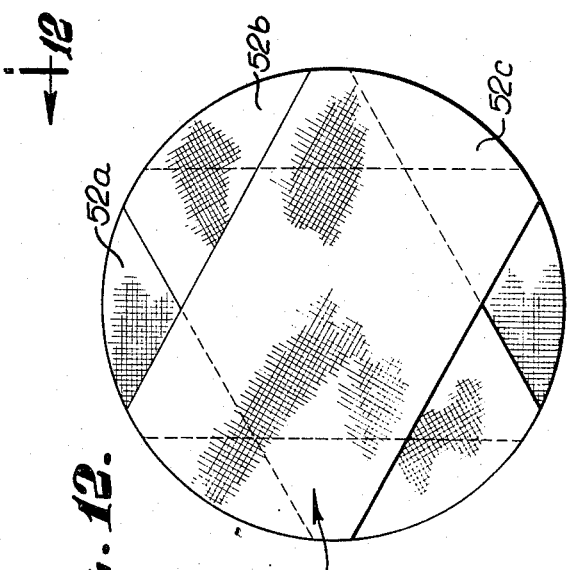
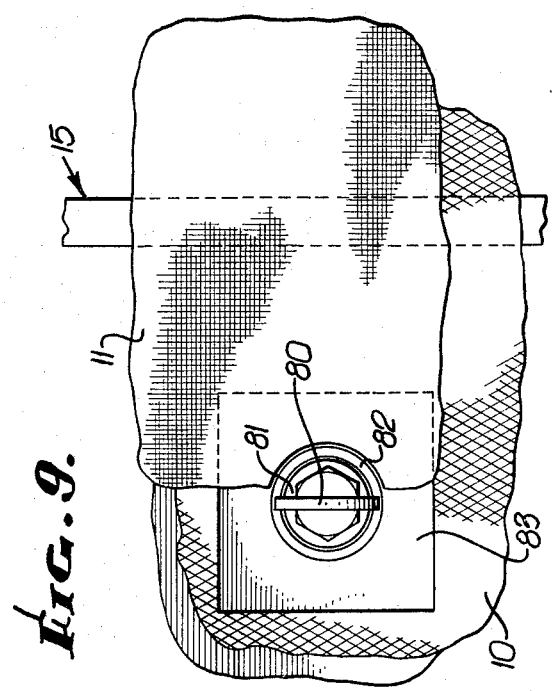
INVENTOR.
CHARLES E. KREMPEN
By Bernard Kriegel
ATTORNEY.

COMPOSITE STRUCTURE

The present invention relates to a composite structure, and more particularly to pipes, tanks, building panels, and like structures of a composite nature.

Gastight tanks, and similar devices, have heretofore been made of sheet steel secured to a frame structure. Such tanks have been relatively costly to manufacture, very heavy, difficult to transport and handle, and capable of withstanding relatively limited low pressure differentials. Gasoline storage tanks buried in the ground are also subject to corrosion and must be capable of withstanding the weight of vehicles bearing upon the ground immediately above the tank. The withstanding of such forces requires the tank to have an increased strength, which adds to its weight.

The present invention provides a composite structure, such as a tank, which is of lighter weight than prior tanks, is more easily transported and handled, withstands greater pressure differentials, resists corrosion and other harmful effects, and is economical to fabricate. In general, when in a tank form, it comprises a framework, including flat foraminous metal, such as flat expanded metal, or other foraminous material, such as foraminous sheet plastic, to which an impervious covering is sealed by an elastic plastic bonding resin, the seal being completely around the margins of each opening of the foraminous sheet material. Because of the yieldability of the elastomeric bonding resin, the seal is retained despite some relative movement between the fabric and the flat foraminous sheet material or frame, such that distortions do not break the seal and thereby weaken the structure.

Because of the skeletonized framework employed, it is of light weight for its size and strength. The framework is covered by an impervious sheet material bonded thereto, which is also of comparatively light weight. The entire composite structure, despite its light weight, is still strong and sturdy, and capable of withstanding relatively high pressure differentials.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a side elevational view, with portions broken away to reveal different portions thereof, of a tank structure embodying the invention;

FIG. 2 is an end view taken along the line 2—2 on FIG. 1;

FIG. 3 is a cross-section taken along the line 3—3 on FIG. 1;

FIG. 4 is an enlarged fragmentary longitudinal section, parts being shown in side elevation, through an end portion of the tank structure;

FIG. 5 is a section taken along the line 5—5 on FIG. 4;

FIG. 6 is a section taken along the line 6—6 on FIG. 4;

FIG. 7 is a section taken along the line 7—7 on FIG. 4;

FIG. 9 is an enlarged fragmentary top elevational view, with parts broken away, taken along the line 9—9 on FIG. 1;

FIG. 11 is a diagrammatic view disclosing the arrangement of the fabric covering on the tank structure;

FIG. 12 is an end view of the tank structure taken along the line 12—12 on FIG. 11;

Figure 8:
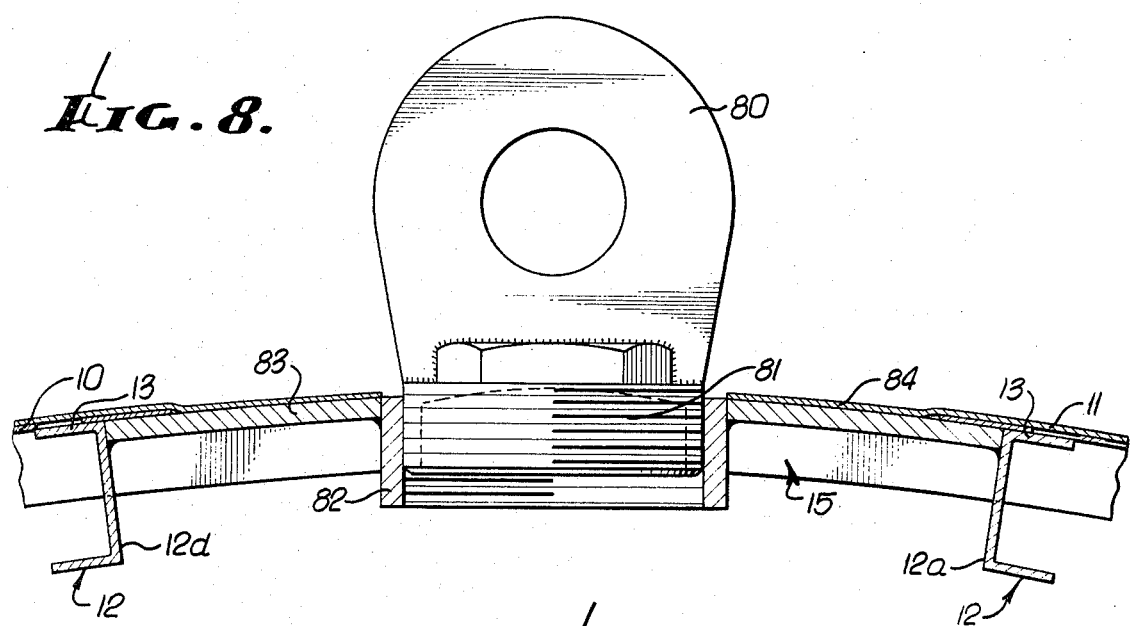
FIG. 8 is an enlarged section taken along the line 8—8 on FIG. 1.

The invention is illustrated in the drawings as applied to a tank, such as an underground gasoline storage tank. It is to be understood, however, that the invention is applicable to other structures, such as pipes, building panels, and the like. In general, the structure includes a sheet of flat expanded metal 10 having a sealed fabric of glass or nylon cloth 11 bonded thereto with an elastomeric bonding agent, such as a polyurethane elastomeric plastic.

As specifically illustrated, the tank includes a plurality of circumferentially spaced longerons 12 which may be channel-shaped in cross-section and with one flange 13 of each channel facing outwardly. These longerons are provided with recesses or notches 14 at predetermined spaced intervals along their length to receive longitudinally spaced rings 15. The rings may also be channel-shaped in cross-section, the notches 14 in the longerons having a depth conforming to the width of the flanges 16 of the rings, such that the outer surfaces 17 of the webs 18 of the rings lie substantially flush with the outwardly facing surfaces 19 of the longeron flanges 13.

The rings 15 are welded, or otherwise suitably secured, to the longerons 12, the longerons holding the rings in the desired longitudinally spaced relation with respect to each other while the attachment of the rings to the longerons retains the latter in circumferentially spaced parallel relation with respect to each other.

The rings 15 are substantially circumferentially continuous, but are split at their lower ends to provide a gap 20 therebetween, so that fluids can flow freely along the entire bottom of the tank from one end to the other. The spacing between the lower ends of each ring is maintained by the lower end of a vertical strut tube 21 fitting between the flanges 16 of the ring and secured thereto, as by welding material 22 (see in particular FIG. 6). The upper end 23 of the strut tube is flattened into an oval shape and fits between the flanges 16 of the ring, the upper portion of the strut tube being secured to the upper portion of the ring in any suitable manner, as by welding material 24. The tubular strut serves to reinforce the ring, its lowermost end 25 being spaced upwardly a short distance from the lower surface of the ring web 18 so that there is a passage through the ring from one side to the other.

An end ring 26 similar to the other ring 15 is provided at each end of the frame structure, this ring 26 abutting an adjacent ring 15 and being suitably secured thereto, as by a plurality of circumferentially spaced tack welds 27. Each end of each longeron has a notch 28, as disclosed in FIG. 4, so that the inner portion of the longeron web 29 and its inner flange 30 project within the two adjacent end rings 15, 26, the longeron terminating to one side of the outermost flange 31 of the end ring, as disclosed in FIG. 4.

The structure for closing each end of the tank further includes a plurality of struts or spokes 32 that extend across and which are attached to the end ring 26. As shown, these spokes, which may be of channel-shape, have their outer web surfaces 33 disposed within the outer flange 31 of the end ring. One of the spokes 34 extends across the diameter of the end ring, there being two aligned spokes 35 extending from within the end ring to the side flanges of the first main spoke 34; whereas, there are two pairs of other spokes 36, each pair being aligned, extending from the end ring 26 to the junction between the radial spokes 35 and the diametral spoke 34. In all of the spokes, the outer surfaces 33 of their webs lie in substantially the same plane. These spokes may be suitably secured to one another by welding, or the like. Flattened expanded metal 37 bears against the webs of the spokes, being suitably tacked or spot welded thereto at appropriate intervals, the entire spoke and flattened expanded metal arrangement being disposed within the end ring 26, with the expanded metal engaging the outer end ring flange 31. The spoke structure and expanded metal are suitably secured, as by welding, to the end ring flange 31, thereby completing an end frame portion of the structure.

Flat foraminous sheet material 10, such as flattened expanded metal, is mounted upon the ring and longeron frame. As an example, the flattened expanded metal may be about 14 to 16 gauge. Sheets of expanded metal are placed upon the framework and are curved therearound to conform to the rings 15. Thus, one edge 40 of a sheet of foraminous material will commence at the midpoint of the outer flange 13 of one of the longerons, with the opposed edges 41 of the sheet at right angles thereto, lying approximately midway of the webs 18 of a pair of rings 15. The length of the sheet is such that it will extend from one longeron 12 to another longeron 12, ending at substantially the middle of the longeron flange 13. By way of example, and as disclosed in FIGS. 1 and 3, three sheets 10a, 10b, 10c will extend 360° around the structure, one sheet 10a running from one of the longerons 12a to another longeron 12b displaced 120° therefrom, the next sheet 10b extending from the last-mentioned longeron 12b to a third longeron 12c displaced 120° therefrom, while the third sheet 10c will extend from longeron 12c to the first longeron 12a. Similarly, the sheet may have a width as to extend from one ring 15a across a second ring 15b to a third ring 15c, terminating at the first and third rings 15a, 15c, as disclosed in FIG. 1. Accordingly, the edges 40, 41 of each sheet of material overlap and terminate at either a longeron 12 or a ring 15 to both of which the sheet is suitably secured by spot welding, or the like. The sheets 10 of foraminous material are placed around the entire framework of longerons and rings, extending from a channel ring 15 adjacent one end ring 26 to the channel ring 15 at the opposite end of the framework adjacent the opposite end ring 26.

When the framework has been completed, with the foraminous sheets 10 encircling the tank structure from a location adjacent one end to a location adjacent the opposite end, and with the end framework 32, 34, 35, 36 and expanded metal 37 mounted within each end ring 26, the framework is covered with a sealed fabric 11, such as nylon cloth or glass cloth, such cloth being bonded to the expanded metal and also to the outwardly facing surfaces of the rings and longerons by use of an elastic bonding agent, which may also serve to seal the surface of the fabric. The fabric 11 may be wound in helical fashion on the framework, with the turns of the fabric overlapping one another, or it may be placed on the framework completely therearound using fabric of a predetermined width, the widths overlapping one another, as disclosed in FIG. 11. The bonding agent is placed upon the inner surface of the cloth 11, which is then pressed against the flattened expanded metal 10. The bonding agent on the overlapping margins 51 of the cloth will bear against the outer margin of an adjacent layer of cloth and be bonded thereto. As disclosed in the drawings, the cloth 11 is not only bonded to the flat surfaces of the expanded metal 10, but also to the outwardly facing surfaces of the longerons 12 and rings 15 with which it comes in contact, and also to the outer surfaces of the end rings 26, as shown in FIG. 4.

Following covering of the framework with the fabric layer 11, the end structures are also covered with fabric. As disclosed in FIGS. 4 and 12, each end is closed by a fabric 52 of glass or nylon cloth that has a bonding agent applied to its inner surface. Such cloth is placed upon the end structure and will also overlap the previously applied fabric 11 placed around the cylindrical portion of the tank structure. As disclosed in FIG. 12, three widths of cloth 52 are used, their center lines being displaced about 120° apart and their width being such that they completely cover the end structure. If desired, four, five, or more widths could be used, uniformly displaced from one another to completely cover the end structure. As shown in FIG. 12, the first width 52a is placed upon the end structure, being brought into firm contact with the end foraminous metal 37 to seal thereagainst, and also extending across the outer end of the end ring 26 and over the cylindrical cloth 11, adhering to all of these parts by the elastomeric bonding agent on the inner surface of the cloth 52a. The second width of cloth 52b, appropriately angularly displaced, is then placed over the first cloth and against the exposed underlying expanded metal, the ends of the second width or strip overlapping the cylindrically wound fabric 11 and adhering thereto by its bonding agent, as well as against the previously applied width, the exposed flattened expanded metal and the outer surface of the end ring flange 31. The third width of cloth 52c is then similarly applied over the previously applied width 52b and over the cylindrically wound cloth 11, to complete the end structure and to seal the latter completely.

Both end structures are enclosed by the fabric in the manner just described to complete the tank structure.

To add further strength to the tank, a continuous filament glass layer 60 can be wound around the cylindrical fabric 11 previously applied. The filament glass may be in tape form of a desired width and is coiled helically around the fabric 11, the filament being coated with a suitable bonding agent for adherence to the underlying fabric or cloth previously applied to the framework.

Figure 13:
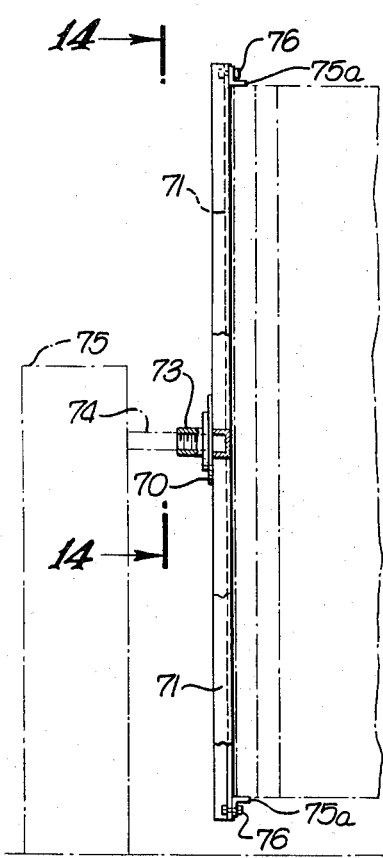
FIG. 13 is a side elevation of a turning fixture usable in producing the tank structure.
Figure 14:
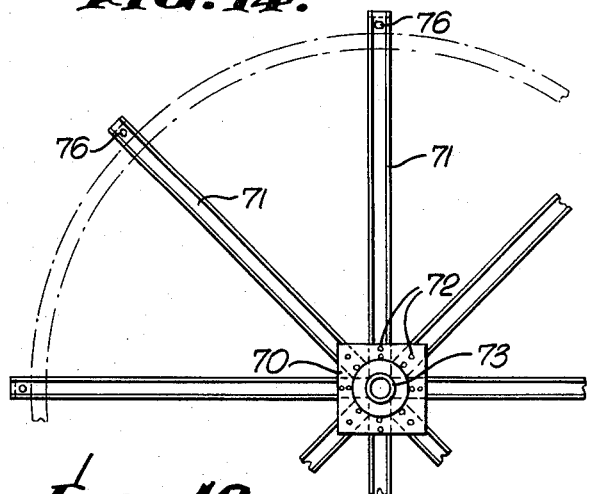
FIG. 14 is a view taken along the line 14—14 on FIG. 13.
Figure 10:
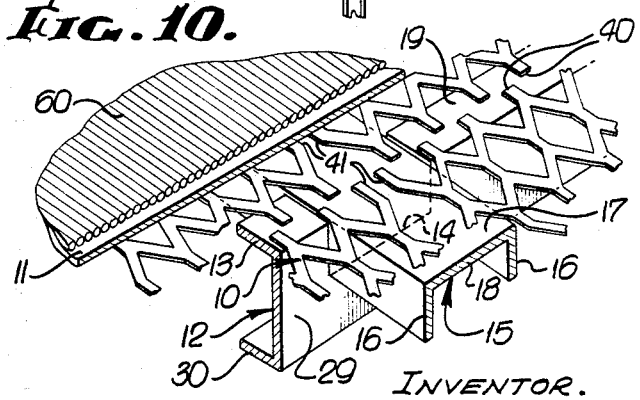
FIG. 10 is an enlarged isometric projection of a portion of the composite tank structure disclosing some of the components thereof.

To facilitate winding of the filament glass 60, a tank turning fixture disclosed in FIGS. 13 and 14 may be employed. At each end of the tank structure, this fixture includes a plate 70 having spokes 71 secured thereto by bolts or screws 72, the plate being suitably secured to a hub 73 having a threaded bore for threadedly receiving a shaft or trunnion 74 rotatable on a suitable support 75. At the outer end of each spoke, a clip 75a is secured by a bolt 76, or the like, this clip being adapted to bear against the outer surface of the cloth 11 or the periphery of the end ring 26, if the fixture is used also for placing the underlying fabric 11 upon the expanded metal 10, rings 15 and longerons 12.

To facilitate transportation of the tank, and also to provide a fluid filling opening in its upper portion, a pair of longitudinally spaced lifting lugs or eyes 80 are each secured by welding, or the like, to a threaded plug 81 adapted to be received within a threaded collar 82 welded or otherwise secured to a plate 83 of appropriate width extending between an upper pair of longerons 12a, 12d and secured thereto as by welding. The upper surface 84 of each plate is preferably made flush with the upper surface 19 of the longerons. The expanded metal 10 overlies each plate 83 on all sides of the collar 82, but will terminate short of the collar, such that the fabric 11 will not only adhere adhesively to the expanded metal, but also to the plate 83 itself around the collar, insuring a leakproof seal therebetween.

Not only will the spaced lifting lugs 80 facilitate movement of the tank and its placement into and from a location of use, but the unthreading of one or both of the plugs 81 permits a fluid material to be deposited in the tank or removed therefrom, the plug being replaced when desired.

The expanded metal 10 is covered with a tightly woven glass or cloth that is impregnated with an elastomeric material, such as a polyurethane, epoxy or polyester resin, which functions as a bonding and sealing agent. Where the covering 11 for the expanded metal is of polyamide fibers, preferably woven nylon of ballistic nylon grade, it is preferred that the fabric not be impregnated, but rather that it be coated only with a thin film of the elastomeric plastic used to bond the fabric to the expanded metal 10 and the other metal surfaces with which it comes in contact, as well as to bond the overlapping portions of the fabric to each other. This coating should preferably be thick enough to provide a smooth surface to the fabric, being applied to the side bonded to the expanded metal 10, 37 or to both sides of the surfaces of the fabric 11. When the fabric employed is made of glass fibers, it is essential that the entire fabric be thoroughly impregnated with the elastomeric plastic, to prevent individual glass fibers from contacting one another.

When synthetic plastic fibers comprise the fabric 11 to be bonded to the foraminous metal, it is advisable to coat, rather than impregnate the fabric. This provides greater overall strength to the resulting composite structure, as well as greater impact resistance. The surface of the coated plastic fiber fabric, facing away from and opposite that of the surface bonded to the foraminous metal, may be coated with either a thin mixture or unthin mixture of the elastomeric plastic.

Good results have been achieved by using a polyurethane elastomeric plastic as a bonding and coating agent. Such a polyurethane elastomer is known as "Elastalon," being available from Coast Chemical Company, 119 East Ellis Place, Fullerton, California 92632. This "Elastalon" resin is a low-melting polyal resin having a light tan appearance. It is mixed with a polyurethane elastomer hardener, which is an isocyanate-terminated polyether pre-polymer having a yellow-amber viscous syrup appearance at room temperature. The following is the formulation of a polyurethane elastomer used to impregnate glass fiber fabrics:

| Proportion by Weight | Description |
|---|---|
| 100 parts | "Elastalon" C.E. Resin |
| 35 parts | "Elastalon" C.E. Hardener |
| 10 parts | ethyl acetate or 50/50 mixture of xylene and cellosolve acetate |

The proportions of a polyurethane elastomer used to coat synthetic fiber fabrics are as follows:

| Proportion by Weight | Description |
|---|---|
| 100 parts | "Elastalon" C.E. Resin |
| 35 parts | "Elastalon" C.E. Hardener |

A foraminous metal of the type known as "flattened expanded metal," such as manufactured by United States Gypsum, has proven to be an excellent material from which to fabricate composite structures embodying the invention. Specific types which have been used successfully include those having openings of 1½ inches in the short width of the diamond and gauges designated as No. 16 and No. 13. Such flattened expanded metal may be made from carbon steel or aluminum.

In lieu of employing the flattened expanded metal, flat foraminous sheet plastic may be used which is adhered to the longerons and rings by a suitable resin, the tank structure being covered and sealed by plastic sheet films placed over the foraminous sheet plastic material, the plastic sheet film being bonded ultrasonically to the foraminous plastic. For that matter, the foraminous sheet plastic may be adhered to the rings and longerons by first heating the latter to a required elevated temperature, which, for example, may be about 300° F., so that the foraminous sheet material is heat-sealed thereto, the heat-seal bond being an elastic one or generally the same type of bond as secured by the use of the polyurethane elastomeric plastic for adhering the fabric to the longerons and rings.

I claim:

1. A composite structure comprising a frame including first members spaced from each other and second members spaced from each other and secured to said first members in angular relation with respect thereto to provide a skeleton structure, a formaninous layer of flattened expanded metal having one side engaging and secured to said skeleton structure with the edges of said expanded metal overlying and terminating at said first and second members, a sheet overlying the opposite side of said foraminous layer of expanded metal and said members, and a bonding and sealing agent bonding said sheet to said opposite side and said members to provide a seal between said sheet and said members and also said opposite side to completely seal around each opening of said foraminous layer of expanded metal.

2. A composite structure as defined in claim 1; said foraminous layer of flattened expanded metal having diamond-shaped openings.

3. A composite structure as defined in claim 1; wherein said sheet comprises a fabric of woven polyamide fibers.

4. A composite structure as defined in claim 1; wherein said sheet consists of woven nylon of ballistic nylon grade.

5. A composite structure as defined in claim 1; said sheet being composed of glass fibers.

6. A composite structure as defined in claim 1; said sheet being composed of glass fibers, and said bonding and sealing agent being a polyurethane elastomeric plastic impregnating said sheet to produce a non-porous reinforced plastic sheet.

7. A composite structure as defined in claim 1; said bonding and sealing agent being a polyurethane elastomeric plastic.

8. A composite structure as defined in claim 1; said sheet being woven nylon of ballistic nylon grade, and said bonding and sealing agent being a polyurethane elastomeric plastic, coating said sheet to render said sheet non-porous to fluids.

9. A composite structure as defined in claim 1; said sheet being woven nylon of ballistic nylon grade, said bonding and sealing agent being a polyurethane elastomeric plastic, coating said sheet to render said sheet non-porous to fluids, and further comprising a layer of glass filaments on said sheet, and a polyurethane elastomeric plastic impregnating said glass filament layer and adhering said glass filament layer to said sheet.

10. A composite tubular structure comprising a frame including longitudinally spaced annular members, circumferentially spaced longerons secured to said members to provide a skeleton structure therewith, a foraminous layer of material around said skeleton structure having one side engaging said longerons and annular members and secured at least to said annular members with the edges of said foraminous layer of material overlying and terminating at said annular members, a sheet disposed around the opposite side of said foraminous layer of material, and an elastomer composed of a polyurethane elastomeric plastic bonding said sheet to said opposite side and to said annular members and longerons to provide an elastic seal between said sheet and said members and longerons and also between said sheet and said opposite side to completely seal around each opening of said foraminous layer of material, said foraminous layer of material being flattened expanded metal and consisting of generally rectangular sections each having a first pair of opposed edges overlying and terminating at said annular members and a second pair of opposed edges overlying and terminating at one or more of said longerons.

11. A composite structure as defined in claim 10; said sheet being woven nylon, said elastomer coating said nylon sheet to render said sheet non-porous to fluids.

12. A composite structure as defined in claim 10; said sheet being composed of glass and said elastomer impregnating said sheet to produce a non-porous reinforced plastic sheet.

13. A composite structure as defined in claim 10; said sheet being woven nylon, and said elastomer coating said nylon sheet to render said sheet non-porous to fluids, and further comprising a layer of glass filaments wound on said sheet, and a polyurethane elastomeric plastic impregnating said glass filament layer and bonding said glass filament layer to said sheet.

14. A composite structure comprising a frame including a foraminous layer of material, a sheet overlying a surface of said foraminous layer of material, and an elastomer bonding said sheet to said surface to provide an elastic seal between said sheet and surface completely around each opening of said foraminous layer of material, said sheet consisting of woven nylon of ballistic nylon grade and said elastomer being a polyurethane elastomeric plastic, coating said sheet to render said sheet non-porous to fluids, said foraminous layer of material being flattened expanded metal.

15. A composite tubular structure comprising a frame including longitudinally spaced annular members, circumferentially spaced longerons secured to said members to provide a skeleton structure therewith, a foraminous layer of material around said skeleton structure having one side engaging said longerons and annular members and secured at least to said annular members with the edges of said foraminous layer of material overlying and terminating at said annular members, a sheet disposed around the opposite side of said foraminous layer of material, and a bonding and sealing agent bonding said sheet to said opposite side and to said annular members and longerons to provide a seal between said sheet and said members and longerons and also between said sheet and said opposite side to completely seal around each opening of said foraminous layer of material, said frame further including supporting members extending across each end portion of said tubular structure, an end foraminous layer of material secured to said supporting members, end sheet material engaging said end foraminous layer of material at each end portion of said tubular structure to close the same, and a bonding and sealing agent bonding said end sheet material to said end foraminous layer of material to completely seal around each opening of said end foraminous layer of material.

16. A composite tubular structure as defined in claim 15; said foraminous layers of material being flattened expanded metal and said bonding and sealing agents being a polyurethane elastomeric plastic.

17. A composite tubular structure as defined in claim 16; said sheet and said end sheet material being woven nylon, and said bonding and sealing agent coating said sheet and said end sheet material to render them non-porous to fluids.

18. A composite tubular structure as defined in claim 15; said foraminous layer of material being flattened expanded metal and consisting of generally rectangular sections each having a first pair of opposed edges overlying and terminating at said annular members and a second pair of opposed edges overlying and terminating at one or more of said longerons, said frame further including supporting members extending across each end portion of said tubular structure, end flattened expanded metal secured to said supporting members, end sheet material engaging said end expanded metal at each end portion of said tubular structure to close the same, and a bonding and sealing agent bonding said end sheet material to said end expanded metal to completely seal around each opening of said end expanded metal.

19. A composite tubular structure as defined in claim 18; said bonding and sealing agents being a polyurethane elastomeric plastic, said sheet and said end sheet material being woven nylon, and said bonding and sealing agent coating said sheet and said end sheet material to render them non-porous to fluids.

20. A composite tubular structure as defined in claim 19; further comprising a layer of glass filaments wound on said sheet, and a polyurethane elastomeric plastic impregnating said glass filament layer to bond said glass filament layer to said sheet.

21. A composite structure comprising a frame including a foraminous layer of material, a sheet overlying a surface of said foraminous layer of material, and an elastomer bonding said sheet to said surface to provide an elastic seal between said sheet and surface completely around each opening of said foraminous layer of material, said sheet consisting of woven nylon of ballistic nylon grade and said elastomer being a polyurethane elastomeric plastic, coating said sheet to render said sheet non-porous to fluids, said foraminous layer of material being sheet plastic.

* * * * *